Figure 1:
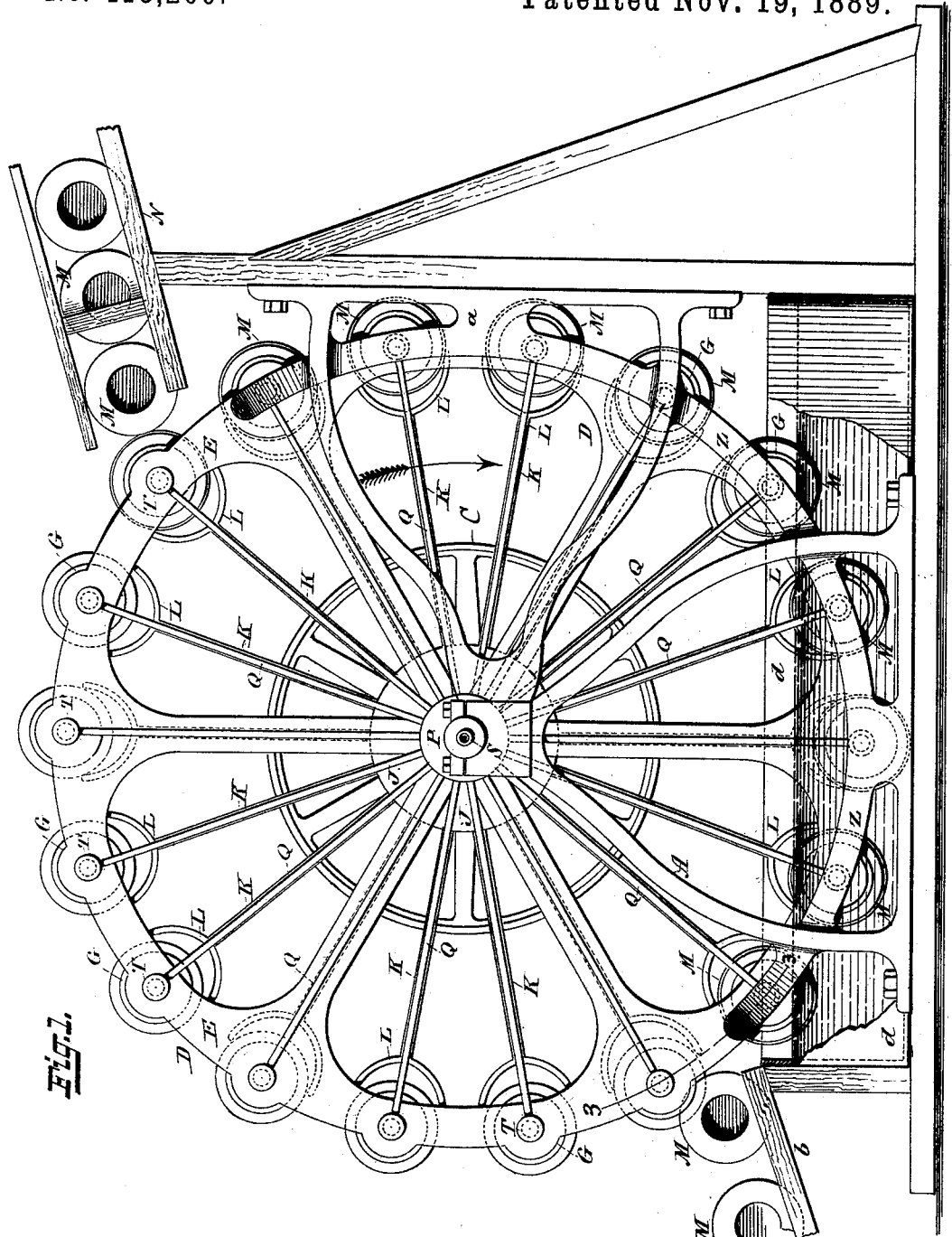

(No Model.) 3 Sheets—Sheet 1.

W. HIPPERLING.
MACHINE FOR TESTING CANS.

No. 415,200. Patented Nov. 19, 1889.

WITNESSES:
Gustave Dieterich
William R. Ellison

INVENTOR
William Hipperling,
BY
Chas. C. Gill
ATTORNEY (No Model.) 3 Sheets—Sheet 2.
W. HIPPERLING.
MACHINE FOR TESTING CANS.
No. 415,200. Patented Nov. 19, 1889.
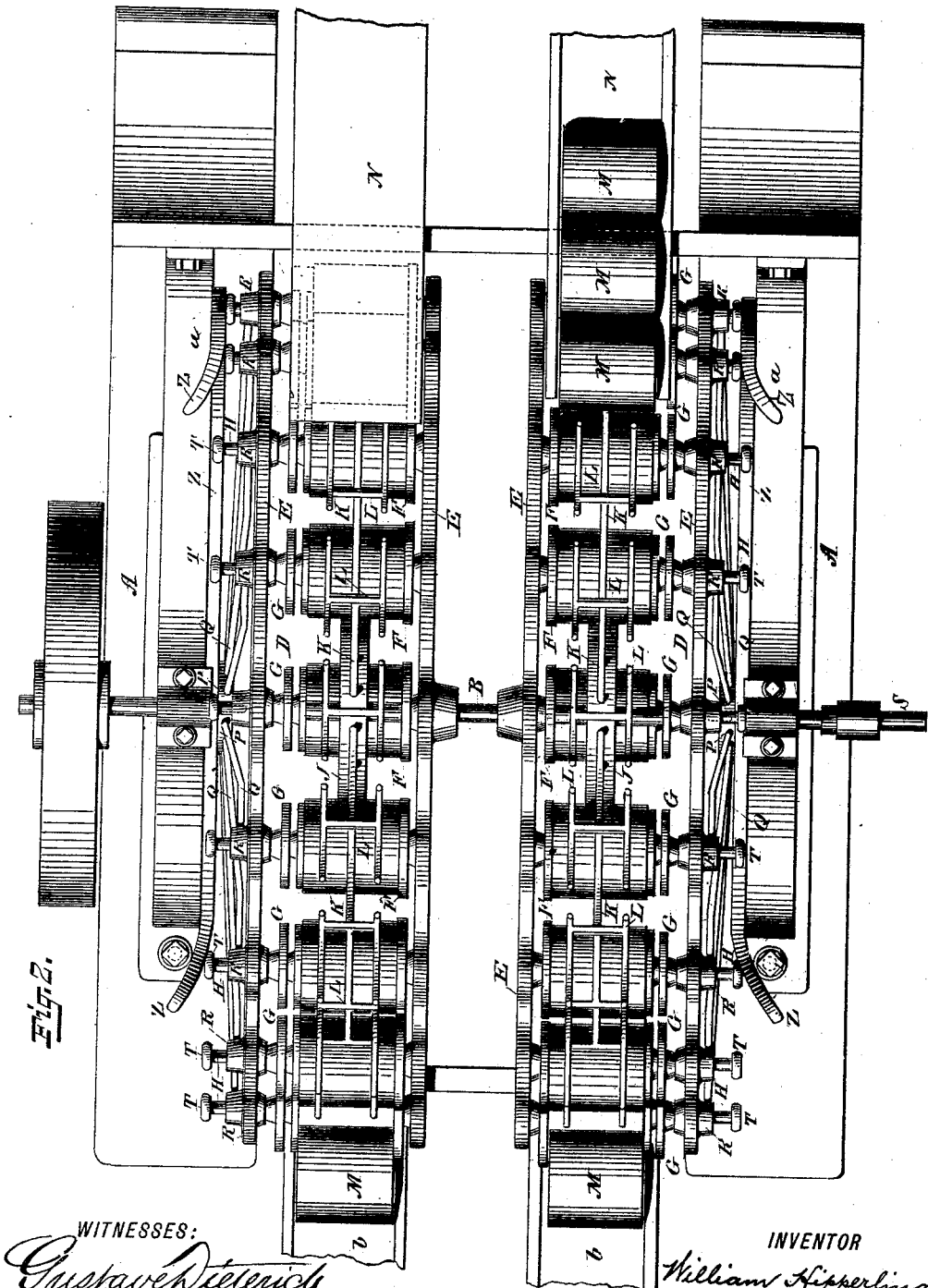
WITNESSES:
Gustave Dieterich
William B. Ellison
INVENTOR
William Hipperling,
BY
Chas. C. Gill
ATTORNEY

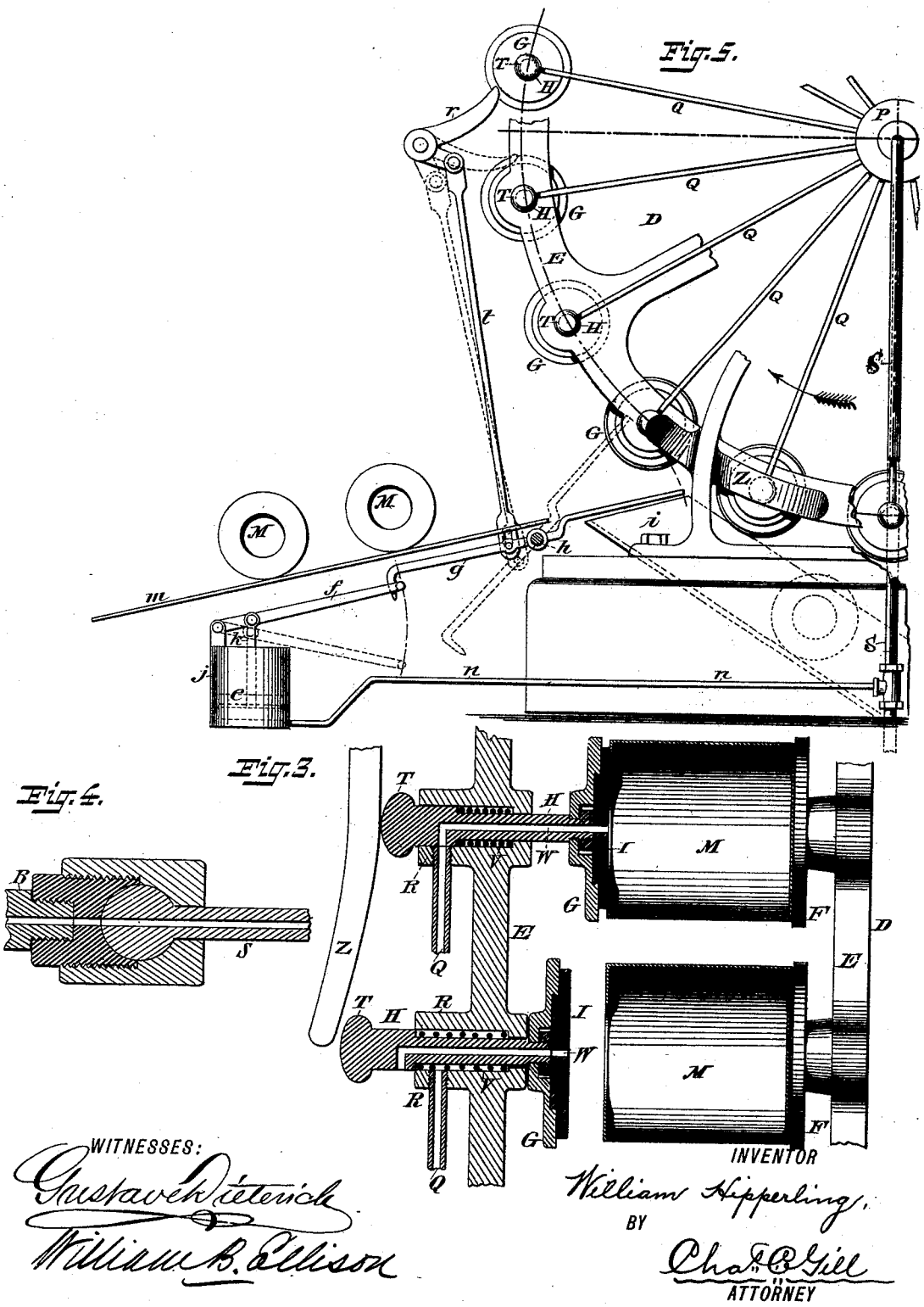

UNITED STATES PATENT OFFICE.

WILLIAM HIPPERLING, OF NEW YORK, N. Y., ASSIGNOR TO STEPHEN A. GINNA, OF PLAINFIELD, NEW JERSEY, AND RICHARD A. DONALDSON, OF BROOKLYN, NEW YORK.

MACHINE FOR TESTING CANS.

SPECIFICATION forming part of Letters Patent No. 415,200, dated November 19, 1889.

Application filed August 31, 1888. Serial No. 284,231. (No model.)

*To all whom it may concern:*

Be it known that I, WILLIAM HIPPERLING, a citizen of the United States, and a resident of New York, in the county of New York and State of New York, have invented certain new and useful Improvements in Machines for Testing Cans, of which the following is a specification.

The invention relates to improvements in machines for use in the manufacture of tin cans; and it consists in novel means, hereinafter described, for testing the seams of the cans after they have left the seaming and heading machines and are being conveyed away on a traveling chain or chute.

In accordance with my invention, the cans leave the traveling chain or chute, and are caught, one after another in succession, between a series of clamping-heads connected with a revolving wheel or frame and actuated to close against the cans by a cam, the clamping-heads at one end of the cans, when closed by said cam, serving also to establish a communication between the interior of the can and a suitable air-supply. In case any of the cans are defective as to their seams the air will escape through the same, and thus indicate that they are imperfect and should be separated from the rest of the cans.

The invention will be fully understood from the detailed description hereinafter presented, reference being had to the accompanying drawings, in which—

Figure 1 is a side elevation of an apparatus embodying the elements of the invention; Fig. 2, a top plan view of same; Fig. 3, an enlarged sectional view taken on the dotted line 3 3 of Fig. 1; Fig. 4, a central horizontal section of one end of the shaft supporting the revolving wheel or frame carrying the clamping-heads. Fig. 5 is a side elevation of a detached portion of a modified form of apparatus embodying the invention.

In the accompanying drawings, A designates supporting standards or frames, in which is journaled the horizontal shaft B, which is adapted to be rotated by a belt-wheel C or other suitable appliance and carries the wheels D D, each of the latter being composed of corresponding frames E E, set a suitable distance apart and provided on their facing sides adjacent to their periphery with the can-clamping heads F G, the heads F being stationary, and those lettered G being secured on movable spindles H and provided with the rubber or other soft facings I, adapted to insure the firm clamping of the cans without bruising them, and to seal the opening in the head of the cans against the escape of air therefrom.

Upon the shaft B, between each pair of the frames E E composing the wheels D, is secured a hub J, from which radiate the equidistant rods K, carrying at their outer ends the frames L, adapted to receive the cans M from the chute N and to sustain them until they are clamped between the heads F G. Upon the shaft B are also secured the hubs P, one being at the outer side of each wheel D, as shown in Fig. 2, from which the air-tubes Q radiate and enter the collars R, as shown enlarged in Fig. 3, which sustain the spindles H. The hubs P afford a communication between the tubes Q and the interior of the shaft B, which is hollow, as indicated in Figs. 1 and 4, and is connected by the ball-joint (shown in Fig. 4) or other suitable union with a tube S, leading from any suitable supply of air under pressure. The tube S, the shaft B, and the tubes Q are constantly full of air, the end of the shaft B opposite to the tube S being closed to prevent the escape of the air at that point.

The spindles H have a head T at their outer end, and within the collars R are reduced in diameter and encompassed by a coiled spring V, (see Fig. 3,) exerting a spring-tension outward. The spindles H have also interior air-passages W, which extend beyond the heads G and through the rubber facings I thereon, so as to communicate with the interior of the cans when said heads G are moved inward to clamp the same. The outer end of the air-passage W in each spindle H is turned at a right angle to the main portion thereof, and its position is such that when the spindle is in the outward position, as shown in the lower part of Fig. 3, it will be beyond the outer end of the collar R, and that when the spindle is in its inward position, as shown in the upper part of Fig. 3, it will register with the air-tube Q, and thus establish a communication from the air-supply to the interior of the can clamped between the heads F G. The spindles H are, one after another in succession, moved inward during the revolution of the wheels D D, and held in their inward position a definite length of time by the cam-bars Z Z, as shown in Figs. 1, 2, and 3, which are supported by the standards A and brackets $a$, and have their opposite ends turned outward, so as to move the heads of the spindles H gradually inward.

The cans, leaving the chute N one after another, fall into the receivers L, and are clamped between the heads F G and brought into communication with the air-supply, owing to the rotation of the wheels D D, bringing the spindles H into contact with the cam-bars Z Z. The cans thus clamped between the heads F G are carried by the wheels D D in the direction of the arrow shown in Fig. 1 until the spindles H leave the lower end of the cam-bars Z Z, when the coiled springs V will force the heads G and spindles H outward, releasing the cans and permitting them to escape down the chute $b$. During the rotation of the wheels D D the cans are carried through a body of water in the receptacle $d$, and it is while they are immersed in the water that the defective ones are disclosed to the attendant. It will be remembered that the cans while held between the clamping-heads F G are in communication with the air-supply. While the cans are traveling through the water in the receptacle $d$ the air will escape through any defective seams and cause a bubbling in the water, which will be observed by the attendant and indicate to him that the can over which the bubbles appear is defective and should be discarded as soon as it is released by the clamping-heads F G.

In the construction presented in Fig. 1 the bubbling of the water serves to designate the defective cans; but the apparatus may be employed in connection with other means for indicating the defective cans, as illustrated in Fig. 5, in which the wheels D, spindles H, clamping-heads, and air-connections are precisely the same as those shown in Figs. 1, 2, 3, and 4. The cams Z, however, may be shorter, as shown, since the defective cans are determined by the momentary escape of air therefrom, which operates to lessen the air-pressure beneath the piston $e$ and causes the lever $f$ to fall and the pivoted plate $g$ to rock upward on the pivot $h$, as represented by dotted lines in Fig. 5, this movement causing the defective cans, as the spindles H leave the cam Z, to escape down the chute $i$, which is devoted exclusively for this class of cans. The piston $e$ is within the air-cylinder $j$, and its piston-rod $k$ is pivoted to the hinged lever $f$, having at its outer end an eye to receive the hooked end of the pivotally-sustained plate $g$, the outer end of said plate when in its normal position, as shown by full lines in Fig. 5, serving as a continuation of the chute $m$ for conducting away the perfect cans as they leave the wheel D. The cylinder $j$ is connected below the piston $e$ by a pipe $n$ with the air-pipe S, which supplies the air-tubes of the wheel D, and which in practice will lead from an ordinary air-pump, (not shown,) by which a definite pressure of air is kept in the air-tubes of the wheel D and the cylinder $j$, said pressure being sufficient to preserve the piston $e$ in the position shown, and at the same time permit said piston to fall with the lever $f$ whenever said pressure is lessened by the escape of air through the seams of a defective can appearing beneath the cam Z. As above mentioned, the fall of the piston $e$ permits the tilting upward of the pivotally-secured plate $g$, for the purpose of enabling the defective can emerging from the clamping-heads F G to escape down the waste-chute $i$. After the plate $g$ has been tilted upward it is necessary to return it to its normal position, and this may be accomplished by means of the trip $r$ and connecting-rod $t$, the trip being elevated by the contact of one of the clamping-heads G, and drawing upward the rod $t$ and outer end of the plate $g$, while the air-pump will renew the pressure in the cylinder $j$ and return the piston $e$ and lever $f$ to their former position.

In the drawings I illustrate two wheels D D; but in instances where the manufacturer does not require such large capacity the machine may be constructed with a single wheel D, which will be operated in the manner described above with respect to the two wheels.

What I claim as my invention, and desire to secure by Letters Patent, is—

1. In a can-testing machine, the frames E E, forming a wheel and mounted upon a driving-shaft, combined with the clamping-heads F G, carried by said frames, the hollow spindle H, connected with the heads G, the series of tubes Q, leading from a source of air-supply to said spindles H, the springs for moving said heads G in one direction, and the cam Z, for moving them in the opposite direction, substantially as set forth.

2. In a can-testing machine, the frames E E, forming a wheel and mounted upon a driving-shaft, combined with the clamping-heads F G, carried by said frames, the hollow spindles H, connected with the heads G, the series of tubes Q, leading from a source of air-supply to said spindle H, the springs for moving said heads G in one direction, the cam Z, for moving them in the opposite direction, and the receptacle $d$, containing liquid and arranged to receive the periphery of said wheel during its rotation, substantially as set forth.

3. In a can-testing machine, the frames E E, forming a wheel and mounted on the hollow driving-shaft B, combined with the clamping-heads F G, carried by said frames, the hollow spindles H, connected with the heads G, the hub P on said shaft, the series of tubes Q, radiating from the hub P to said hollow spindles, the springs for moving the heads G in one direction, and the cam Z, for moving them in the opposite direction, substantially as set forth.

4. In a can-testing machine, the frames E E, forming a wheel and mounted upon the driving-shaft, combined with the clamping-heads F G, carried by said frames, the hollow spindles H, connected with the heads G, the series of tubes Q, leading from a source of air-supply to said spindles H, the springs for moving the heads G in one direction, the cam Z, for moving them in the opposite direction, the hub J on the driving-shaft, and the rods K and receiving-frames L, radiating from said hub, substantially as set forth.

5. In a can-testing machine, the frames E E, forming a wheel and mounted on the hollow driving-shaft, combined with the clamping-heads F G, the spindles H, mounted in collars R and supporting heads G, the air-passages W in said spindles, the springs V, encompassing said spindles, the cam Z, for clamping the heads G against the cans, the hub P on the driving-shaft, and the series of tubes Q, radiating from the hub P to the collars R, substantially as set forth.

Signed at New York, in the county of New York and State of New York, this 29th day of August, A. D. 1888.

WILLIAM HIPPERLING.

Witnesses:
CHAS. C. GILL,
R. A. PORTEOUS.